US00RE34389E

United States Patent [19]

Amon et al.

[11] E Patent Number: Re. 34,389

[45] Reissued Date of Patent: Sep. 28, 1993

[54] SECURITY DOCUMENT PRINTING INK

[75] Inventors: Albert Amon, Lausanne; Anton Bleikolm, Ecublens; Pierre Degott, Pully; Olivier Rozumek, St Martin; Haim Bretler, Lausanne, all of Switzerland

[73] Assignee: Sicpa Holding SA, Switzerland

[21] Appl. No.: 944,229

[22] Filed: Sep. 14, 1992

Related U.S. Patent Documents

Reissue of:

[64] Patent No.: 4,966,628
Issued: Oct. 30, 1990
Appl. No.: 313,092
Filed: Feb. 21, 1989

U.S. Applications:

[63] Continuation-in-part of Ser. No. 186,598, Apr. 28, 1988, abandoned.

[51] Int. Cl.[5] ..... C09D 11/08

[52] U.S. Cl. ..... 106/30 B; 106/20 R; 106/23 R; 106/23 E

[58] Field of Search ..... 106/20 R, 23 R, 30 B, 106/23 E

[56] References Cited

U.S. PATENT DOCUMENTS

| | | | |
|---|---|---|---|
| 3,948,668 | 4/1976 | Hayek et al. | 106/23 R |
| 4,079,026 | 3/1978 | Mone | 106/27 R |
| 4,231,906 | 11/1980 | Giorgetti | 106/31 R |
| 4,400,216 | 8/1983 | Arora | 106/23 H |
| 4,589,920 | 5/1986 | Kanada et al. | 106/20 R |
| 4,612,052 | 9/1986 | Schwartz | 106/20 R |
| 4,654,082 | 3/1987 | Frilette | 106/30 B |
| 4,732,616 | 3/1988 | Kondo et al. | 106/30 R |
| 4,764,215 | 8/1988 | Rudolph | 106/23 R |
| 4,822,419 | 4/1989 | Pepoy et al. | 106/23 R |

FOREIGN PATENT DOCUMENTS 1469717 4/1977 United Kingdom .

OTHER PUBLICATIONS

Chemical Abstracts 106:86377y, 1986.
Chemical Abstracts 106:86378w, 1986.
The Printing Ink Manual, 4th ed. by R. H. Leach, Norstrand Reinhold (Intern.) Publishers, pp. 20–21, 34–39, 59–60.

*Primary Examiner*—Helene Klemanski
*Attorney, Agent, or Firm*—Ostrolenk, Faber, Gerb & Soffen

[57] ABSTRACT

A printing ink for the printing of security documents by the method of engraved steel die printing, wherein the volatile solvents comprise at most 15%, referred to the total weight of the ink, of one or more volatile organic substances, and wherein the volatile matter may further contain water.

These inks reply to the new environmental requirements and have still a better wipability on the printing cylinders or plates. They allow document printing without interleaving.

17 Claims, No Drawings

SECURITY DOCUMENT PRINTING INK

Matter enclosed in heavy brackets [ ] appears in the original patent but forms no part of this reissue specification; matter printed in italics indicates the additions made by reissue.

This is a continuation-in-part of application Ser. No. 186,598 filed Apr. 28, 1988, and now abandoned.

FIELD OF THE INVENTION

This invention belongs to the field of printing inks. More specifically, it is related to printing inks containing volatile substances and which are to be used in the method of engraved steel die printing for the printing of security documents such as checks, shares, airline tickets, banknotes, etc.

DESCRIPTION OF THE PRIOR ART

Security documents need to be printed. The printings must be of outstanding high quality and be safe against falsification and counterfeiting.

Security documents are generally printed by a special intaglio printing process. The term "intaglio printing", as a general term, comprises the use of printing ink carrying surfaces, typically printing cylinders or printing plates, where the pattern to be printed is engraved and the engravings are filled with printing ink to be transferred to the printing substrate in order to create the document. The term "intaglio printing" as used in this application shall only define as the engraved steel die printing process where chromium plated, engraved steel or nickel plates or cylinders are used, and shall not include the well known rotogravure or gravure printing process.

Furthermore this invention does not relate to low viscous printing inks for the conventional gravure printing where a totally different concept of ink formulation is necessary. It is rather related to printing inks in paste form for engraved steel die printing.

In engraved steel die rotary printing, a rotating engraved steel cylinder is supplied with ink by one or more template inking cylinders by which a pattern of inks of different colour is transferred to the printing cylinder. Any excess of ink on the plain surface of the printing cylinder is then wiped off by a rotating wiper cylinder covered by a plastisol, using diluted aqueous sodium hydroxide as an emulsifying medium for the wiped-off excess ink, or a paper/calico wiping device. Then, the printing pattern in the engravings of the printing cylinder is transferred, under a pressure up to about 500 bars, on the substrate to be printed which may be paper or plastic material in sheet or web form. These steps and the machines used for engraved steel die printing are known in the art.

The main requirements for printing inks to be used to print security documents by the engraved steel die method on modern, presently used sheet fed presses or web machinery are the following:

correct rheological properties at the moment of ink transfer to the printing cylinder and at the moment of printing.

The ability of the excess ink to be easily and quantitatively removed from the non-printing areas of the die surface by a PVC-plastisol or rubber wiping cylinder (wipeability).

The ease of cleaning the wiping cylinder by means of a solution of 0.1 to 1% of caustic soda in water or even pure water (detergability);

Stability of the ink on the inking rollers and until the moment of printing: this means the control of the evaporation of volatile matter during the printing process.

Film forming characteristics allowing further manipulation of sheets or webs carrying printed films of up to 200 microns thickness 24 hours after printing or respectively immediately after printing.

Non-offseting properties:

In case of web printing with hot air drying devices (as supplied e.g. from TEC-Systems, W.R. Grace & Co.) web speeds of up to 150 m/min., when using engravings of up to 200 microns, have to be assured.

On sheet fed presses 500 to 10,000 sheets, depending on printing substrate and depth of engraving, have to be stackable in piles right after printing without interleaving;

outstanding chemical and mechanical resistance of the printing according to specifications established by INTERPOL at the 5th International Conference on Currency and Counterfeiting in 1969 or the Bureau of Engraving and Printing test methods as stated in BEP-88-214 (TN) section M5.

Typically, a conventional engraved steel die printing ink for security documents has the following composition, all percentages being by weight and referring to the total of the inks:

20 to 40% of unsaturated oleo-resinous compounds, polymerizable or curable by oxidation reactions;

10 to 60% of extenders such as $CaCO_3$, $BaSO_4$, $TiO_2$, aluminium silicates;

1 to 30% of organic and/or inorganic colour pigments;

15 to 30% of volatile organic solvents, and polymerization initiators, curing agents and other auxiliary agents in minor amounts.

The applicant's assignee has actively been involved in the creation and manufacturing of the above mentioned materials during the last 20 years. For instance, the move from the so called "trichloroethylene wiping intaglio printing inks" for the engraved steel die printing press to the "waterwiping technology" using intaglio inks which can easily be removed from the PVC wiping roller with a solution containing 1% NaOH and 1% sulfonated castor oil, was prepared and strongly influenced by the Assignee Sicpa SA. This change allowed the industry to abandon the use of highly toxic solvents such as chlorinated hydrocarbons and has to be considered as a major advancement in the protection of environment.

The volatile organic solvents used are typically mixtures of mineral oils (hydrocarbons) having a boiling range of from about 180° to about 300° C., and low molecular glycol ethers.

Already it has been tried to reduce the concentration of volatile organic substances in the printing ink for engraved die printing. Thus, U.S. Pat. No. 4,764,215 (Rudolph) suggests to incorporate into a conventional water-wipe intaglio ink a drying oil soap, namely the combination of a metal hydroxide, a hydroxyamine such as triethanol amine, [are] *and* a drying oil. Although the only Example for the manufacture of such a drying oil soap does not disclose a metal hydroxide, it is believed that the drying oil soaps are metal soaps of unsaturated fatty acids stabilized against micelle formation by the hydroxyamine. It is certain that these soaps are low molecular compounds or compositions.

Though such soaps may be effective in allowing the reduction of the hydrocarbon solvents content of the printing inks, it has been found that they do not allow stable incorporation of even very low amounts of water. Furthermore, printing inks which contain said drying oil soaps in amounts of from 10 to 60% by weight, with or without reduction of the solvents content, do not sufficiently dry after printing, even not after a ten day period. The ink are not resistant against the action of alkali, and the general resistance or fastness properties are not acceptable.

There is therefore still a need for printing inks having reduced solvent contents but which behave the same as more solvent containing inks or even better.

OBJECTS OF THE INVENTION

In most countries, the environmental protection laws do no longer permit the use of most of organic solvents.

In the printing industry, solvents can often not or not fully be recovered from the exhaust air streams which are emitted from the printing/dryer installations. Environmental air and also the air in the printing houses are thus contaminated by solvent vapours. The solvents typically used in engraved steel die printing such as high-boiling mineral oils, glycol ethers, etc., are considered to be dangerous for the human health.

Therefore, there is a first and major object of this invention to provide engraved steel die printing inks wherein the amount of the organic solvents is drastically reduced and optionally replaced in part or totally by water.

Another object of the invention is to provide engraved steel die printing inks which do not contain more than about 15% and even less than 12% by weight of volatile organic solvents.

Still another object of this invention is to provide engraved steel die printing inks for the printing of security documents which fulfill all requirements regarding the processability and the printing results which are characteristic for organic solvent-based inks.

Another object of the invention is to provide engraved steel die printing inks which can perfectly be emulsified in even weaker solutions of caustic soda or even in pure water.

A further object of the invention is to provide engraved steel die printing inks which can easily be wiped off a chromium plated nickel cylinder or plate at low temperatures by means of a plastisol wiping cylinder or a paper/calico wiping device. Still another object of the invention is to provide engraved steel die printing inks which give better non-offsetting properties on sheet fed presses allowing to increase the number of sheets stackable when using heavily engraved plates.

A further object of the invention is to provide steel die printing inks to be used on web presses which allow to increase printing speed up to 150 m/min. when using a hot air drying device at an air temperature of 100 to 180° C. Still a further object of the invention is to provide engraved steel die printing inks with improved mechanical resistance to crumpling and flexing and having outstanding adhesion to highly specified banknote paper carrying gelatin or PVOH-sizing.

SUMMARY OF THE INVENTION

The above mentioned objects and still others are attained by the invention which, in its broadest aspect, is characterized by the fact that the amount of volatile organic solvents in the printing ink is reduced to about 15% by weight or less, referred to the total weight of the ink, typically but not necessarily by the introduction of water.

This has become possible by [replacinq] *replacing* part of the oleo-resinous compounds in the conventional compositions by resinous matter having a certain degree of hydrophilic properties, due to the presence of polar groups of ionic or nonionic nature. Details will be explained later. This was surprising since one would expect serious difficulties in printing and unacceptable characteristics of the printings obtained on security documents when the resinous phase in the well-balanced overall composition of conventional inks is modified.

DETAILED DESCRIPTION OF THE INVENTION

The printing ink of this invention contemplates compositions wherein the solvent concentration, compared to the inks presently available, is reduced. This solvent reduction may be achieved as such, i.e. in incorporating less solvent than before into a printing ink or in replacing part of the amount of organic solvent normally used in known inks by water, or by the combination of these two features.

The [applicant's has] *applicants* first tried to reduce the solvent content of printing inks for engraved steel die printing by replacing the difference in the amount of volatile organic solvents by water or by adding low molecular, well known tensides or soaps, i.e. surface active agents of anionic, nonionic or cationic nature. However, these attempts have been unsuccessful since the required chemical resistances, drying characteristics and non-offsetting properties of the printings could never be achieved, and stabilization of water in the ink was impossible.

Now, in trying to facilitate the removal of ink from the wiping cylinders by means of aqueous cleansing compositions, which are currently used in the method of engraved steel die printing, it has surprisingly been found that such oleoresinous components of conventional engraved steel die printing inks which have some weak hydrophilic properties, can in part or even totally be replaced by hydrophilic macromolecular surface active agents or surfactants of different chemical nature. These macromolecular surface active compounds have to be film formers by themselves. They should be compatible with the film forming resins of the ink and should loose most of their hydrophilic properties after the physical and chemical drying of the ink. It has further been found that the film forming reactions allowing the achievement of this mandatory loss of hydrophilic properties, in order to assure the required chemical resistance of the final prints, are oxypolymerisation, interpolymer neutralisation and formation of three dimensional interpenetrating networks. These macromolecular surfactants can be obtained by polymerisation, polyaddition or polycondensation reactions. Their synthesis is well known in the art and does not belong to this invention.

The hydrophilic macromolecular surfactants to be used according to this invention are nonionic, anionic or cationic as well as zwitterionic ones. The functional groups attached to these macromolecules are for example carboxylic or sulfonic acid groups, hydroxyl groups, ether groups or primary, secondary, tertiary or quaternary amino groups. The acid groups may be neutralized with amines, alkanolamines or preferably inorganic bases, or combinations thereof. Primary, secondary and tertiary amino groups may be neutralized with inorganic or organic acids such as sulfonic acids, formic acid, acetic acid, trifluoroacetic acid and others.

Zwitteronic compounds comprise equivalent numbers of acidic and basic groups.

The term "macromolecular surfactant" as used herein shall to be understood as defined e.g. by M. B. Rosen in "Surfactants and Interfacial Phenomena" (John Wiley + Sons 1978) but shall also comprise materials beyond this definition behaving merely as protective colloids. The materials may be used in concentrations up to about 30% by weight of the ink formulation and act at the surface and interface of the numerous components of the ink which are present as solids or liquids.

The macromolecular surfactants which are used according to the invention, have a [number] *weight* average molecular weight in the range from 1000 to 150,000, preferably of from 3000 to 20,000. They may be selected from the hereafter listed classes of surfactants and their mixtures. In particular, the following groups of surfactants are preferred:

A. Nonionic macromolecular surfactants,

B. Anionic macromolecular surfactants,

C. Cationic macromolecular surfactants,

D. Equivalent or non-equivalent mixtures of groups (B) and (C)

E. Mixtures of macromolecular surfactants of group (A) with such of group (D),

F. Mixtures of macromolecular surfactants of group (A) with such of group (B) or (C).

G. Macromolecular surfactants of group A–F with monomolecular surfactants of nonionic, anionic or cationic nature.

The correct selection of the particular macromolecular surfactant composition will depend upon the particular ink composition and may easily be determined by the one skilled in the art by few and simple tests.

Examples of macromolecular surfactants which may be used in the inks of this invention are:

Anionic macromolecular surfactants

These materials are obtained by neutralisation with organic or inorganic bases of the following polymers.

1. Addition reaction products of fumaric acid or maleic anhydride to unsaturated vegetable oils, adducts of phenolic resins and vegetable oils, or polybutadiene type resins (acid number comprised between 10 to 250 mg KOH/g resin), polyamides, polyethers.

2. Alkyd resins and modified alkyd resins (phenolic, epoxy, urethane, silicone, acrylic or vinylic modified alkyd resins). The acid number is comprised between 10 and 150 mg KOH/g resin.

3. Epoxy resins and modified epoxy resins carrying carboxylic acid groups. The acid number is comprised between 30 and 200 mg KOH/g resin.

4. Saturated polyester resins and modified saturated polyester resins (acid number between 50 and 250 mg KOH/g resin).

5. Polymers and copolymers containing between 2 and 100% of acrylic acid and/or methacrylic acid and/or maleic acid and/or styrene sulfonic acid (acid number between 20 and 150 mg KOH/g resin).

6. Condensation reaction products of rosin and rosin esters with vegetable oils and/or phenolic type resins.

7. Anionic type cellulose ethers.

Nonionic macromolecular surfactants

1. Block copolymers containing polyether or polyamine sections.

2. Copolymers based on vinylacetate and other vinylmonomers of different molecular weight and degree of hydrolysis.

3. Polyethers and adducts of amines with polyethers.

4. Polyamines.

5. Acrylamide type polymers or copolymers.

6. Polysaccharides and nonionic cellulose derivatives.

Cationic macromolecular surfactants

1. Salts of epoxy resins or modified epoxy resins carrying tertiary or secondary amino groups.

2. Salts of secondary and tertiary polyamines.

When such macromolecular surfactants are incorporat d into the inks of this invention where they replace a portion or the whole of the normally used weakly hydrophilic oleo-resinous compounds, several new effects have been found:

Firstly, relatively high amounts of a water can be incorporated into the ink in replacement of a portion of the normally used amount of volatile organic solvents, in such proportions that the ink contains up to 30% of water, referred to the total weight of the ink. (All percentages given below refer to that total weight of the printing ink if not otherwise indicated.) It is believed that the macromolecular surfactants act as solubilizers or compatibility enhancers for the water to be incorporated. At the same time, and this has already been described, the amount of organic solvent which is typically from 20 to 30%, could be lowered under the mark of 15% and even below 12% and 10% by weight.

The use of a mixture of cationic and anionic macromolecular surfactants which is accompanied by interpolymer neutralization, is believed to contribute to the complex mechanism of stabilizing water in the ink matrix so as to obtain the necessary rheology for the engraved steel die printing process.

Secondly, it has been found and this was surprising, that the concentration of the aqueous sodium hydroxyde solution used to clean the plastisol or rubber covered wiping cylinder which wipes off the excess ink from the non-image areas of the engraved steel die before printing, can drastically be reduced. For example, when an aqueous NaOH solution of 0.3 to 1% NaOH is typically used, this amount may be reduced to about 0.1% by weight or the solution may even be replaced by deionized water. This advantage of the invention reduces the consumption of hazardous and expensive substances and renders the solution less aggressive.

Thirdly, it has been found that in most cases, depending on the nature and the viscosity of the macromolecular hydrophilic surfactants of the invention added to the ink, the amount of solvent in the ink can be reduced without the addition of water. This fact has been highly surprising and can be explained by the particular pigment wetting characteristics of the macromolecular film forming surfactants which lead to higher tinctorial strength and diminish the interactions between the oleoresinous compounds serving as supplement binder. In some cases, when the rheology and viscosity of the low solvent, water-free printing ink should be improved, the high boiling hydrocarbon should partly be replaced by appropriate glycol ethers or other solvents, and/or the content of very high molecular oleoresinous components should slightly be reduced.

Fourthly, it has been proven that the usage of the aforesaid macromolecular surfactants allows to improve the bonding of the hardened ink film to highly specified banknote grade papers such as produced by Crane & Co, Portals Ltd., Arjomari, Louisenthal and other specialized companies.

Furthermore it was found that the presence of water facilitates the release of the solvent phase after printing favours precipitation of the ink on paper in leaving behind a rather tack free solid. This allows one to increase the number of sheets stackable right after printing or respectively to increase machine speed on web presses up to 150 m/min. Furthermore and surprisingly, no interleaving is necessary.

Laboratory studies and printing trials on typical printing machines, such as Superintagliocolor 8 or Nota web presses manufactured by König & Bauer, Würzburg, West Germany, for De La Rue Giori, showed clearly that the careful choice of type and quantity of film forming macromolecular surfactants will determine stability of inks on press.

For the printing of paper sheets or the continuous printing of paper webs, an ink of the invention contains up to 20% by weight of a solvent phase, 1% to about 8% by weight thereof being water with organic solvents as the remainder, the total amount of organic solvent being not more than 15%, preferably 12% by weight of the ink.

For the printing of paper sheets, another ink of the invention contains up to 30% by weight of a solvent phase, about 8% to about 20% by weight thereof being water, with organic solvents as the remainder, the total amount of organic solvent being not more than 12%, preferably less than 10% by weight of the ink.

For the continuous printing of paper webs, an ink of the invention contains up to 35% of a solvent phase, about 8% to about 30% by weight thereof being water, with organic solvents as the remainder, the total amount of organic solvent being not more than 15%, preferably 12%, most preferably 5% by weight of the ink.

The inks of this invention are generally prepared as follows. All parts are by weight:

10 to 80 parts, preferably 10 to 40 parts, more specifically 15 parts of oleoresinous ink binder (I) are mixed with 10 to 60 parts, preferably 20 parts of a film forming macromolecular surfactant selected from the aforenamed classes A to G to form an ink base (II) which will be used for grinding of pigments and extenders.

20 to 50 parts of this base (II) are premixed with 50 to 80 parts of pigments and/or extenders on a butterfly mixer as e.g. manufactured by Bühler in Switzerland or Molteni in Italy.

This premixed paste is then transferred to grinding equipment [sudh] *such* as three roll-mills e.g. 1300 SDVE as manufactured by Bühler of Switzerland or any other grinding equipment such as continuously working ball or bead mills such as cobal mill MS50 manufactured by Frvma in Rheinfelden, Switzerland. The grinding process is stopped as soon as a fineness of less than 10 microns is obtained. The pigment paste is then transferred to a heavy duty mixer as e.g. a Vollrath VDDX 80, manufactured by Vollrath in West-Germany for the optional introduction of deionized water and other ink additives such as wax compounds, drying catalysts, [to] antioxidants and other ingredients known to be useful in printing ink formulations.

The manufacturing process finishes with a 30 to 40 minutes mixing operation under vacuum of 0.01 to 0.1 bar in order to take out any dispersed air. At this stage the paste ink is presented to the laboratory of quality assurance for final check of colour characteristics, rheology and printing performance. The necessary equipment is the same as for conventional printing inks and does not need to be described here.

Generally the viscosity of this new type of intaglio inks for the engraved steel die printing process is comprised within 1 to 15, more specifically within 3 to 8 Pa.s at 40° C. and a shear rate of 1000 $sec^{-1}$.

The water containing intaglio inks manufactured in the now described manner are products being stable at temperatures within −30° to +50° C. for more than 1 year.

As oleoresinous compounds (I) the following types of resins can be used: medium to long oil content alkyd resins, vinyl-acrylic, siloxane, phenolic resin or urethane modified alkyd resins, addition products of phenolic resin or rosin esters to vegetable oils or polybutadien derivatives, mineral oil soluble copolymers, epoxide resins, epoxide esters of fatty esters or any other film forming conventional binder useful for printing ink formulation.

The remaining components of the engraved steel die printing inks of the invention are substantially the same as in the inks known heretobefore, with the exception of the reduced amount of oleoresinous components and of the presence of a polar phase as part of the oleoresinous component, allowing stabilisation of water within the ink system without altering chemical and mechanical resistances of the final print. The level of these resistances has been strictly recommended by the fifth International Conference on currency and counterfeiting by the International Criminal Police Organization (INTERPOL).

The invention now permits [to fit in] even with the most stringent *legislation* to be met in that the content of volatile organic solvents of the printing ink could be decreased under the mark of 12%, even 10%, by weight.

The following Examples are only given for the purpose of a better understanding of this invention. They will not limit the scope thereof. All parts are by weight.

EXAMPLE I SHEET FED INTAGLIO INK

Part I

Preparation of the macromolecular surfactant (rosin modified phenolic type):

60 parts of rosin modified phenolic resin are first reacted with 25 parts of raw tung oil at 220° C. for two hours. The product is then dissolved in 15 parts of a mineral oil (boiling range 170°-260° C.). The acid number is situated between 75 and 90 mg KOH/g resin. The [number] *weight* average molecular weight, determined by GPC analysis, is [2000] *2156* g/mol. Finally, the product is neutralized with an aqueous solution of 25% potassium hydroxyde to a pH of 8. The final acid value is below 10 mg KOH/g resin.

Part II

A water containing, non-interleaving intaglio ink is manufactured according to the following formula:

15 parts of macromolecular surfactant as described in part I.

8 parts of alkylphenolic tung oil adduct diluted in a high boiling point oil (Magie 500) to a solids con- -continued

| | |
|---|---|
| | tent of 80%. |
| 10 | parts of long oil alkyd resin diluted in a high boiling print mineral oil (Magie 500) to a solids content of 80%. |
| 2 | parts of the sodium salt of sulfonated castor oil in water (solids content 60%). |
| 2 | parts of micronized polyethylene wax. |
| 3 | parts of a high boiling point mineral oil (Magie 500). |
| 8 | parts of pigment blue 15 (IRGALITHE blue BL, Ciba-Geigy). |
| 35 | parts of calcium carbonate. |
| 2 | parts of a multi metallic dryer (octoacte salts of cobalt, manganese and zirconium diluted in a high boiling point mineral oil to a solids content of 85%). |
| 15 | parts of deionized water thickened with a cellulose ether. |
| 100 | |

All the components except dryer and water are mixed together for 20 minutes at room temperature on a Molteni mixer, then ground on a three roller-mill in order to achieve a fineness below 10 μm. Then the dryer and the water are added, mixed for 15 mn, and deaerated under vacuum on a [molteni] *Molteni* mixer. The viscosity of the ink is 10 Pa.s at 40° C. and the volatile organic content does not exceed 8%. The ink shows a very easy wipability and detergability, excellent non-offsetting properties, and dries perfectly over a period of 24 hours. The prints show excellent chemical and mechanical resistances.

EXAMPLE II SHEET FED INTAGLIO INK

Part I

Preparation of the macromolecular surfactant - acrylic modified alkyd type:

An alkyd resin containing pentaerythritol, ethylene glycol and glycerol monoallyl ether as polyols, isophtalic acid and maleic anhydride as polyacids, and tall oil fatty acid as fatty acid is prepared by polycondensation at 220° C. to an acid number of 10 mg KOH/g. The product is then diluted to a solids content of 60% with methyl ethyl ketone. Acrylic acid, butyl methacrylate, and benzoyl peroxide are then added, and the mixture is heated to 80°-120° C. for three hours. Methyl ethyl ketone is removed, and the product is diluted with a high boiling point mineral oil (Magie 500) to a solids content of 80%. The final acid value is between 40 and 50 mg KOH/g resin, and the [number] *weight* average molecular weight, determined by GPC analysis, is about 3500 g/mol. Finally the product is neutralized with a 10% lithium hydroxyde aqueous solution to a pH of 7.5. The final acid value is below 15 mg KOH/g.

Part II

A water containing, non-interleaving intaglio ink is manufactured according to the following formula:

| | |
|---|---|
| 18 | parts of macromolecular surfactant as described in part I, |
| 15 | parts of a long oil alkyd, |
| 3 | parts of alkyl phenolic resin tung oil adduct diluted in a high boiling point mineral oil (Magie 500) to a solids content of 80%, |
| 3 | parts of a vinyl toluene modified long oil alkyd, |
| 8 | parts of pigment red 146 (permanent carmin FBB-Hoechst), |
| 33 | parts of calcium carbonate, |
| 3 | parts of nonionic surfactant, |
| 2 | parts of micronized polyethylene wax, |
| 2 | parts of a multimetallic dryer (as described in Example 1), and |
| 13 | parts of deionized water. |
| 100 | |

All the components except dryer and water are mixed together for 20 minutes at room temperature on a Molteni mixer, then ground on a three roller mill in order to achieve a fineness below 10 μm. Then the dryer and the water are added, mixed in for 15 mn and deaerated under vacuum on Molteni mixer. The viscosity of the ink is about 8 Pa.s at 40° C. and the product shows excellent machine performance and fulfills all requirements for security document printing.

EXAMPLE III HEAT SET INTAGLIO INK

Part I

Preparation of the macromolecular surfactant:

A medium length alkyd resin carrying carboxylic groups is synthesized by polycondensation at 220° C. of pentaerythritol, phthalic anhydride and linseed oil fatty acids to an acid number below 10 mg KOH/g resin and further addition of phthalic anhydride at 150° C. which is allowed to react for one hour to an acid number of 60 mg KOH/g resin. The product is then diluted in a high boiling point mineral oil (Magie 500) to a solids content of 80%. The [number] *weight* average molecular weight, determined by GPC, is about 3000 g/mol. The product is then neutralized with a 20% aqueous solution of lithium hydroxyde to a final pH of 8.

Part II

A heat-set, water-containing intaglio ink is manufactured according to the following formula:

| | |
|---|---|
| 20 | parts macromolecular surfactant as described in Part I, |
| 11 | parts high melting point, rosin modified phenolic resin dissolved in a long oil alkyd resin and high boiling point mineral oil (Magie 500) to a solids content of 60%, |
| 2 | parts high boiling point mineral oil (Magie 500), |
| 8 | parts pigment blue 15 (Irgalithe blue BL-Ciba-Geigy), |
| 32 | parts calcium carbonate, |
| 3 | parts sodium salt of sulfonated castor oil in water (solids content 60%), |
| 2 | parts micronized polyethylene wax, |
| 1.5 | parts multi-metallic dryer (octoacte salts of cobalt, manganese and zirconium dissolved in a high boiling point mineral oil to a solids content of 85%), and |
| 20.5 | parts deionized water. |
| 100 | |

The manufacturing process is the same as given in Example I.

The new inks of the invention are used in the same manner as the inks known before. They are valuable compositions for the printing of security documents, such as banknotes, checks, traveller checks, credit cards, stamps, shares, passports, airline tickets, lables and similar documents for which measures against counterfeiting and forgery are necessary or indicated.

The preceding description clearly shows the surprising compositions of this invention. It is evident that the practical realization of the invention in the context of the claimed matter may be varied or modified according to the knowledge of the man skilled in the art without departing from the principles and the scope of this invention. Particularly in the field of printing, numerous modifications and improvements are possible in the formulation of printing inks. However, such modifications and improvements are comprised in the scope of protection of this invention.

What is claimed is:

1. A printing ink in paste form for the printing of documents by the method of engraved steel die printing, said ink comprising print forming ink solids which contain oleoresinous components, and at least one volatile organic solvent to be evaporated during or after printing, wherein said ink solids contain a film forming macromolecular hydrophilic surface active composition having a [number] *weight* average molecular weight of at least 1,000 in partial replacement of said oleoresinous components, the weight ratio between said surface active composition and said oleoresinous components being in the range of (10–60):(10–80), and wherein the amount of said volatile organic solvents is less than about 15% by weight of the total weight of the printing ink, the ink containing up to about [40%] *30%* by weight of water.

2. The printing ink of claim 1, wherein said content of volatile organic solvents is less than about 12% by weight.

3. The printing ink of claim 1, wherein said content of volatile organic solvents is less than about 5% by weight.

4. The printing ink of claim 1, wherein said film forming macromolecular hydrophilic surface active composition is selected from nonionic, anionic, cationic and zwitterionic substances and their mixtures.

5. The printing ink of claim 1, wherein said film forming macromolecular hydrophilic surface active composition is used in combination with low molecular surfactants of anionic, nonionic, cationic or zwitterionic nature.

6. The printing ink of claim 4, wherein said film forming macromolecular hydrophilic surface active composition is selected from anionic substances being the salts of carboxylic or sulfonic acid groups in said macromolecules with metals or amines.

7. The printing ink of claim 4, wherein said film forming macromolecular hydrophilic surface active composition is selected from cationic substances being the salts of amino groups in said macromolecules with organic or inorganic acids.

8. The printing ink of claim 1, wherein said macromolecular hydrophilic surface active composition is selected from anionic substances being the salts of carboxylic or sulfonic acid groups in said macromolecules with metals or amines.

9. The printing ink of claim 1, wherein said macromolecular hydrophilic surface active composition is selected from cationic substances being the salts of amino groups in said macromolecules with organic or inorganic acids.

10. The printing ink of claim 1, wherein said macromolecular hydrophilic surface active composition is selected from mixtures of anionic and cationic substances forming an intermolecular neutralization product.

11. The printing ink of claim 1, for the printing of paper sheets or webs, comprising up to about 20% by weight of volatile matter, 1% to about 8% by weight thereof being water with said organic solvent or solvents as the remainder not exceeding 15% by weight, all percentages referring to the total weight of the printing ink.

12. The printing ink of claim 1, for the printing of paper sheets, comprising up to about 30% by weight of volatile matter, about 8% to about 20% by weight thereof being water, with said organic solvent or solvents as the remainder not exceeding 15% by weight, all percentages referring to the total weight of the printing ink.

13. The printing ink of claim 1, for the continuous printing of paper webs, comprising up to about 35% by weight of volatile matter, about 8% to about 30% by weight thereof being water, with said organic solvent or solvents as the remainder not exceeding 15% by weight, all percentages referring to the total weight of the printing ink.

14. A printing substrate printed with an engraved steel die printing ink in paste form comprising print forming ink solids which contain oleoresinous components, and at least one volatile organic solvent to be evaporated during or after printing, wherein said ink solids contain a film forming macromolecular hydrophilic surface active composition having a [number] *weight* average molecular weight of at least 1,000 in partial replacement of said oleoresinous components, and the weight ratio between said surface active composition and said oleoresinous components being in the range of (10–60):(10–80).

15. A method for the printing of documents by engraved steel die printing, wherein a printing ink is used as defined in claim 1, and wherein the printing operation is effected without interleaving of the printed document.

16. In a paste form security printing ink for engraved steel die printing comprising an oleo-resinous compound, extender, pigment and volatile organic solvent, the improvement which comprises the amount of said volatile organic solvent being less than 15 weight % of the ink, a part of said oleoresinous compound being replaced by a film-forming macromolecular hydrophilic surfactant having a [number] *weight* average molecular weight of 1,000 to 150,000, said ink having a viscosity of 1 to 15 Psa. at 40° C. and a shear of 1,000 $sec^{-1}$, the weight ratio between said surfactant and said oleoresinous compound being in the range of (10–60):(10–80), and the ink containing up to about 30% by weight of water.

17. The paste form security printing ink of claim 16 in which the amount of volatile organic solvent is less than 12 weight %, said film-forming macromolecular hydrophilic surfactant has a [number] *weight* average molecular weight of 3,000 to 20,000 and said ink has a viscosity of 3 to 8 Pa.s at 40° C., and a shear of 1,000 $sec.^{-1}$.

* * * * *